United States Patent
Wu et al.

(10) Patent No.: US 7,177,314 B2
(45) Date of Patent: Feb. 13, 2007

(54) TRANSMIT VIRTUAL CONCATENATION PROCESSOR

(75) Inventors: Zhao Wu, San Jose, CA (US); Heng Liao, Belcarra (CA)

(73) Assignee: PMC-Sierra, Inc., Burnaby (CA)

( * ) Notice: Subject to any disclaimer, the term of this patent is extended or adjusted under 35 U.S.C. 154(b) by 945 days.

(21) Appl. No.: 09/943,886

(22) Filed: Aug. 30, 2001

(65) Prior Publication Data

US 2003/0043851 A1   Mar. 6, 2003

(51) Int. Cl.
*H04L 12/56* (2006.01)
*H04J 3/16* (2006.01)
*H04Q 11/00* (2006.01)

(52) U.S. Cl. .................. 370/395.51; 370/369; 370/465
(58) Field of Classification Search ...................... None
See application file for complete search history.

(56) References Cited

U.S. PATENT DOCUMENTS

| | | | | |
|---|---|---|---|---|
| 5,257,261 | A * | 10/1993 | Parruck et al. ............. | 370/522 |
| 5,414,704 | A * | 5/1995 | Spinney ...................... | 370/389 |
| 5,689,508 | A * | 11/1997 | Lyles .......................... | 370/391 |
| 5,923,653 | A * | 7/1999 | Denton ........................ | 370/375 |
| 6,014,708 | A * | 1/2000 | Klish .......................... | 709/232 |
| 6,765,933 | B1 * | 7/2004 | Michel et al. .............. | 370/539 |
| 6,842,455 | B1 * | 1/2005 | Heuer ......................... | 370/393 |
| 6,917,630 | B1 * | 7/2005 | Russell et al. .............. | 370/532 |
| 6,959,151 | B1 * | 10/2005 | Cotter et al. ................. | 398/54 |
| 2002/0001308 | A1 * | 1/2002 | Heuer ......................... | 370/386 |
| 2002/0012141 | A1 * | 1/2002 | Traverso ..................... | 359/124 |
| 2003/0007513 | A1 * | 1/2003 | Barker et al. ............... | 370/476 |

FOREIGN PATENT DOCUMENTS

WO   WO 200131820 A2 * 5/2001

OTHER PUBLICATIONS

U.S. Appl. No. 09/812,821, filed Mar. 21, 2001, T Alexander and D. Wong.
ITU-T Telecommunication Standardization Sector of ITU; Series G: "Transmission of Systems and Media" Recommendation G.707, Mar. 1996.
Gorshe, Steven, Contribution to T1 Standards Project "Revised Draft T105.02 SONET Payload Mappings Standard", Sep. 2000.
Gorshe, Steven, Contribution to T1 Standards Project "Revised Draft T105 SONET Base Standard", Oct. 20, 2000.
Gorshe, Steven, Contribution to T1 Standards Project "Revised Draft T105 SONET Base Standard", Jan. 2001.

* cited by examiner

*Primary Examiner*—Huy D. Vu
*Assistant Examiner*—Clemence Han
(74) *Attorney, Agent, or Firm*—Townsend and Townsend and Crew LLP

(57) ABSTRACT

A transmit virtual concatenation processor for multiplexing channelized data onto a SONET/SDH frame is disclosed. The processor is scalable and is able to handle mapping a number of data channels to a number of different frame sizes including STS-12, STS-48, STS-192 and STS-768. The processor supports virtual concatenation with arbitrary channel mapping at both STS-1 and STS-3c granularities. The processor also supports contiguous concatenation with STS-12c, STS-24c, STS-48c, STS-192c, etc. capacities (i.e., STS-Nc where N is a multiple of 3). In addition, the processor supports mixed concatenation where some channels are using contiguous concatenation and some other channels are using STS-3c-Xv virtual concatenation. Alternatively, the processor is able to support any virtual concatenation, any contiguous concatenation and any mixed concatenation. The processor terminates the H1, H2 and H3 bytes in the line overhead of a SONET/SDH frame and inserts the multi-frame indicator and sequence number in the H4 byte of the path overhead.

15 Claims, 7 Drawing Sheets

| Channel | 0 | 1 | | 2 | | |
|---|---|---|---|---|---|---|
| Bandwidth | STS-1-1v | STS-1-2v | | STS-1-3v | | |
| Timeslot | 4 | 1 | 5 | 3 | 0 | 2 |
| Sequence Number | 0 | 0 | 1 | 0 | 1 | 2 |

| Timeslot | 0 | 1 | 2 | 3 | 4 | 5 |
|---|---|---|---|---|---|---|
| Channel | 1 | 2 | 0 | 1 | 2 | 2 |
| Sequence Number | 1 | 0 | 2 | 0 | 0 | 1 |

Cycle 1:
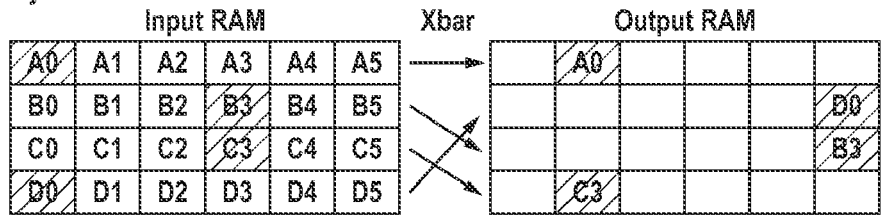
Cycle 2:
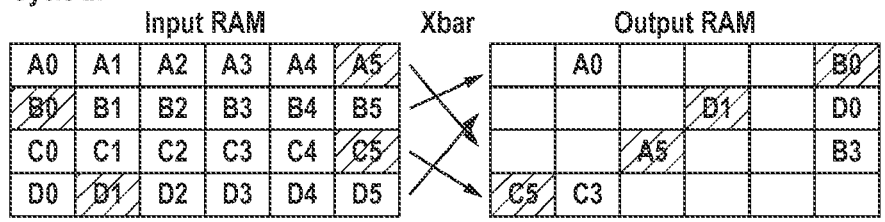
Cycle 3:
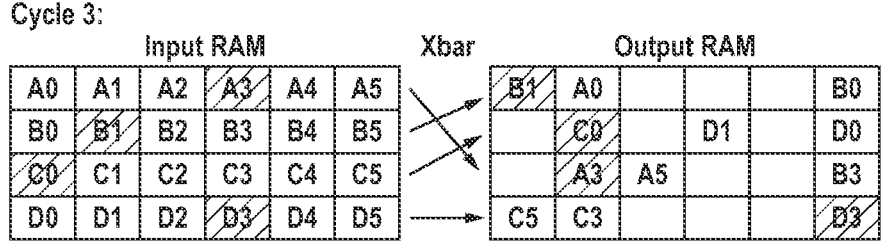
Cycle 4:
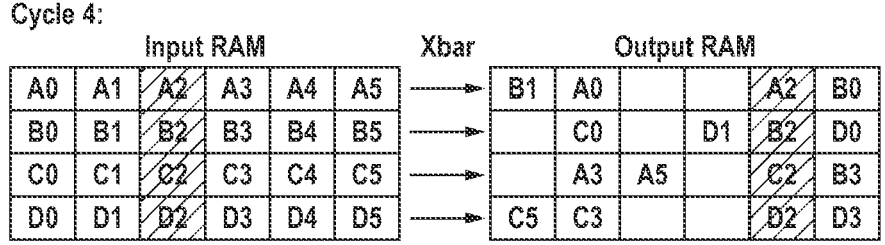
Cycle 5:
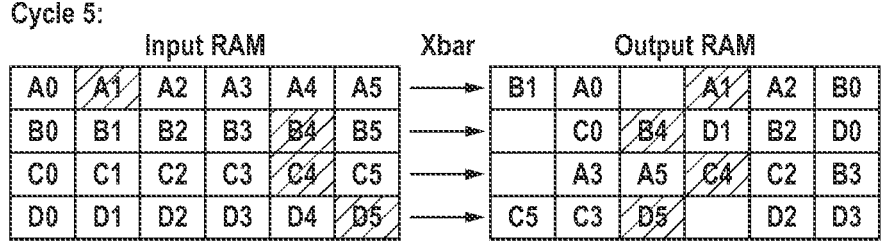
Cycle 6:
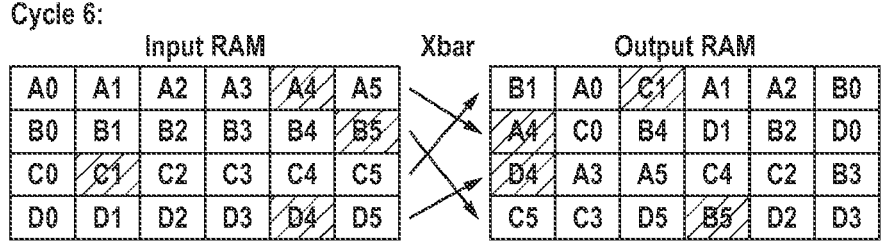
*FIG. 5*

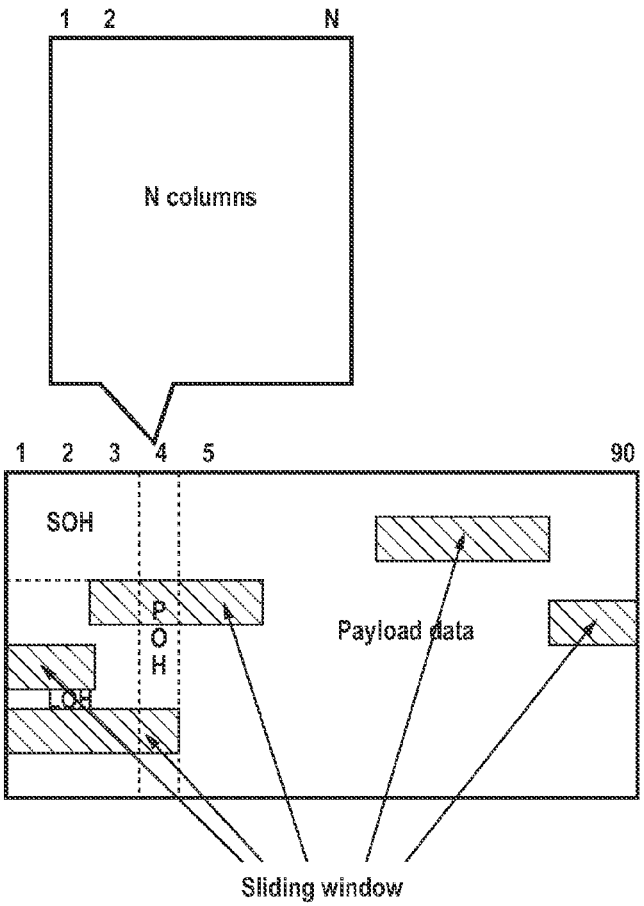

FIG. 6

| Timeslot | 1 | 2 | 3 | 4 | 5 | 6 | 7 | 8 | 9 | 10 | 11 | 12 | 1 | 2 | ... |
|---|---|---|---|---|---|---|---|---|---|---|---|---|---|---|---|
| STS-1 | POH1 | POH2 | POH3 | POH4 | POH5 | POH6 | POH7 | POH8 | POH9 | POH10 | POH11 | POH12 | D1 | D2 | ... |
| STS-3c | POH1 | POH2 | POH3 | POH4 | D1 | D2 | D3 | D4 | D1 | D2 | D3 | D4 | D1 | D2 | ... |
| STS-12c | POH | FS | FS | FS | D | D | D | D | D | D | D | D | D | D | ... |
| STS-24c | POH<br>FS | FS<br>FS | FS<br>FS | FS<br>FS | D<br>D | D<br>D | D<br>D | D<br>D | D<br>D | D<br>D | D<br>D | D<br>D | D<br>D | D<br>D | ... |
| STS-36c | POH<br>FS<br>FS | FS<br>FS<br>FS | FS<br>FS<br>FS | FS<br>FS<br>FS | D<br>D<br>D | D<br>D<br>D | D<br>D<br>D | D<br>D<br>D | D<br>D<br>D | D<br>D<br>D | D<br>D<br>D | D<br>D<br>D | D<br>D<br>D | D<br>D<br>D | ... |
| STS-48c | POH<br>FS<br>FS<br>FS | FS<br>FS<br>FS<br>FS | FS<br>FS<br>FS<br>FS | FS<br>FS<br>FS<br>FS | D<br>D<br>D<br>D | D<br>D<br>D<br>D | D<br>D<br>D<br>D | D<br>D<br>D<br>D | D<br>D<br>D<br>D | D<br>D<br>D<br>D | D<br>D<br>D<br>D | D<br>D<br>D<br>D | D<br>D<br>D<br>D | D<br>D<br>D<br>D | ... |

FIG. 7

TRANSMIT VIRTUAL CONCATENATION PROCESSOR

BACKGROUND OF THE INVENTION

The present invention generally relates to processing of Synchronous Optical Network (SONET)/Synchronous Digital Hierarchy (SDH) frames, and more specifically, to a processor designed to multiplex channelized data onto a SONET/SDH frame.

Virtual concatenation defines an efficient way to utilize the SONET/SDH bandwidth. It is extended based on contiguous concatenation. In contiguous concatenation, certain number of STS-1 timeslots are grouped together to form a larger pipe. Because of various practical and technical constraints, the size of a contiguously concatenated channel is limited to 3N, where N is 1, 4, 16, 64, etc. As a result, if a user only needs 5× the bandwidth of a STS-1 channel, s/he will have to subscribe for a STS-12c channel, thereby wasting both bandwidth and/or money. In virtual concatenation, any number of STS-1 or STS-3c timeslots can be grouped together to provide a larger pipe. Hence, the total available bandwidth can be more efficiently managed and used. Although different timeslots may go through different paths with different propagation delays, synchronization is maintained by cooperation between both the transmit and the receive ends such that the virtually concatenated channel looks like a contiguously concatenated channel.

The ANSI T1-X1.5 is a new and evolving standard on virtual concatenation. Hence, there are currently no devices that fully support this standard. Therefore, it would be desirable to provide a system which is capable of utilizing and taking advantage of the benefits offered by virtual concatenation.

SUMMARY OF THE INVENTION

A transmit virtual concatenation processor for multiplexing channelized data onto a SONET/SDH frame is disclosed. The processor is scalable and is able to handle mapping a number of data channels to a number of different frame sizes including STS-12, STS-48, STS-192 and STS-768. In one embodiment, the processor supports virtual concatenation with arbitrary channel mapping at both STS-1 and STS-3c granularities. The processor also supports contiguous concatenation with STS-12c, STS-24c, STS-48c, STS-192c, ... capacities, i.e., STS-Nc where N is a multiple of 3. In addition, the processor supports mixed concatenation where some channels are using contiguous concatenation and some other channels are using STS-3c-Xv virtual concatenation. In another embodiment, the processor is able to support any virtual concatenation, any contiguous concatenation and any mixed concatenation. Furthermore, the processor terminates the H1, H2 and H3 bytes in the line overhead of a SONET/SDH frame and inserts the multiframe indicator and sequence number in the H4 byte of the path overhead.

Accordingly, in an exemplary embodiment, a system for multiplexing data onto a SONET/SDH frame is disclosed, the system comprising: a calendar configured to selectively direct input data received from a plurality of channels; a processor configured to receive the input data and process the input data using virtual concatenation or contiguous concatenation or a combination of both; and a terminator configured to terminate overhead bytes within the SONET/SDH frame.

The system is able to support STS-N line speed, where N can be 12, 48, 192 and possibly 768. Furthermore, in one embodiment, the system is able to support (1) virtual concatenation with STS-1 or STS-3c granularity, (2) any contiguous concatenation including STS-12c, STS-24c, STS-36c, STS-48c, etc. and (3) mixed concatenation of STS-3c-Xv and any contiguous concatenation. In another embodiment, the system is able to support any virtual concatenation, any contiguous concatenation and any mixed concatenation.

Moreover, the system also supports hitless re-provisioning and a fixed latency from data request to data available. Finally, the system terminates the H1, H2 and H3 bytes in the line overhead and the H4 byte in the path overhead.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

FIG. 5 is a simplified diagram showing the cycle-by-cycle breakdown of the copy process illustrated in FIGS. 4a–4c;

FIG. 6 is a simplified diagram showing a sliding window of payload data across a SONET/SDH frame;

FIG. 7 is a simplified diagram illustrating mapping of different traffic types;

DETAILED DESCRIPTION OF THE INVENTION

According to an exemplary embodiment of the present invention, a transmit virtual concatenation processor (the "TVCP") 10 adopts a scalable architecture to handle STS-N SONET traffic, where N can be 12, 48, 192 and 768. The TVCP 10 is able to handle up to N channels using different types of concatenation, including, for example, virtual concatenation (where a channel is mapped to a number of STS-1 or STS-3c timeslots, thereby forming STS-1-Xv and STS-3c-Xv traffic), contiguous concatenation (where a channel is mapped to an STS-3c, STS-12c, STS-48c, ... etc. flow, i.e., STS-Nc flow where N is a multiple of 3), or a combination of both (where STS-3c-Xv virtual concatenation can be mixed with any contiguous concatenation). In another exemplary embodiment, the TVCP 10 is able to handle any mixed concatenation of both virtual and contiguous concatenation.

The TVCP 10 is generally used to process and transmit data from a system component (system side) to a transmission component (line side). That is, the TVCP 10 receives data from a system component and then processes the data into the proper desired SONET/SDH format/frame thereby allowing the processed data to be transmitted by the transmission component to a receiving component. As will be further described below, incoming data from all the channels is sourced from a single serial stream through a programmable calendar. The TVCP 10 then multiplexes the incoming data and assigns each byte of the incoming data to a timeslot on the outgoing data stream. Because of the high bandwidth, data is often processed in a parallel fashion at rates above STS-12.

Figure 1:
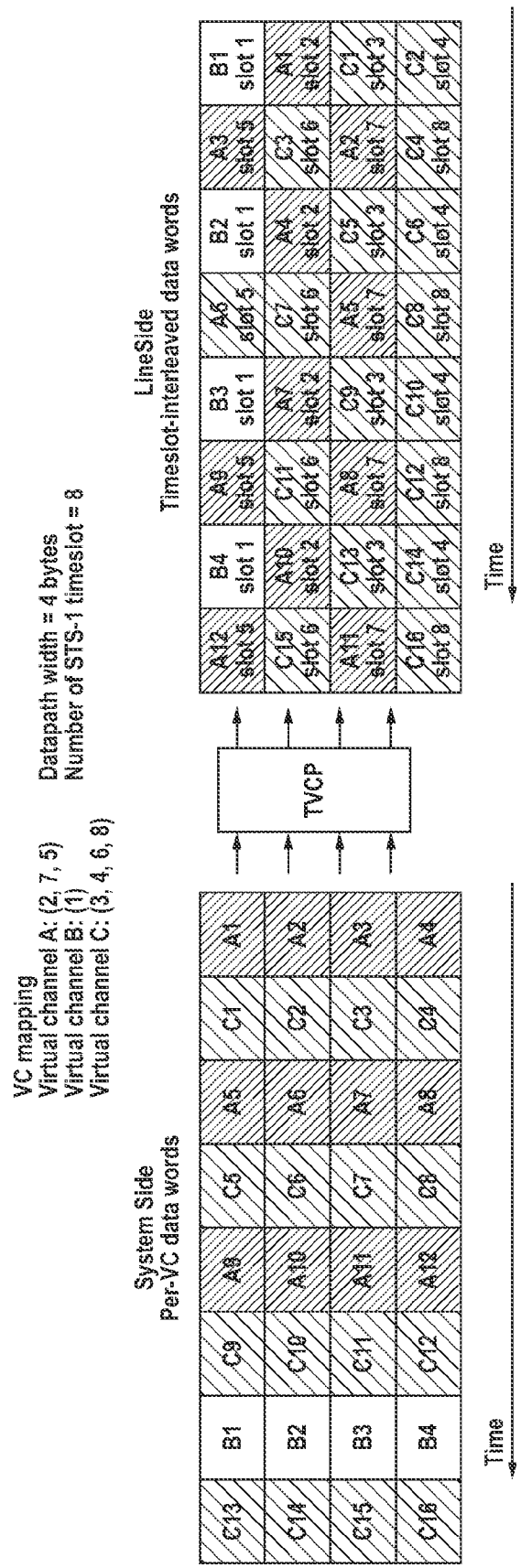
FIG. 1 is a simplified diagram illustrating exemplary operation of an embodiment of the present invention.

FIG. 1 is a simplified schematic diagram illustrating an exemplary operation of the TVCP 10. FIG. 1 shows the data format on both the system side and the line side. For illustrative and simplicity purposes, only the payload data is shown. In this example, three virtual channels, namely, Channel A, Channel B and Channel C, are mapped into an output frame which is an STS-8 frame, and the datapath is 4-byte wide. Since the output frame is an STS-8 frame, there are eight (8) timeslots available per frame. Channel A carries STS-1–3v traffic, which occupies timeslots 2, 7 and 5 of the STS-8 frame. Channel B carries basic STS-1 traffic, which occupies timeslot 1. Channel C carries STS-1–4v traffic, which spans over timeslots 3, 4, 6 and 8. It should be noted that the order of the timeslots is important, for example, timeslot order (2, 7, 5) is different from timeslot order (2, 5, 7).

As depicted in FIG. 1, based on the channel mapping described above, data bytes from Channel A are distributed across timeslots 2, 7, and 5 within each STS-8 frame. More specifically, Channel A is entitled to occupy three (3) timeslots (2, 7, 5) within each STS-8 frame. As a result, within the first STS-8 frame, byte A1 is mapped to timeslot 2, byte A2 is mapped to timeslot 7, and byte A3 is mapped to timeslot 5. After that, within the second STS-8 frame, byte A4 is mapped to timeslot 2, byte A5 is mapped to timeslot 7, and byte A6 is mapped to timeslot 5 and so on.

The data mapping of the other two channels are similar. Channel B is entitled to occupy only one (1) timeslot (1) within each STS-8 frame. Hence, within the first STS-8 frame, byte B1 is mapped to timeslot 1. Likewise, Channel C is entitled to occupy four (4) timeslots (3, 4, 6, 8) within each STS-8 frame, hence, within the first STS-8 frame, byte C1 is mapped to timeslot 3, byte C2 is mapped to timeslot 4, byte C3 is mapped to timeslot 6 and byte C4 is mapped to timeslot 8, and so on.

In addition to mapping payload data, the TVCP 10 is also able to insert section, line, and path overhead bytes to form a properly formatted SONET/SDH frame. Moreover, the TVCP 10 is also able to insert fixed stuff for STS-1, STS-12c, STS-24c, . . . etc. traffic. For most overhead or fixed stuff bytes, the TVCP 10 simply inserts zeros as dummy place holders and downstream SONET processors will subsequently replace such place holders with meaningful data. However, the TVCP 10 does terminate the pointers (H1, H2 and H3) in the line overhead, and insert the multi-frame indicator (MFI) and the sequence number (SQ) in the H4 byte of the path overhead.

Figure 2:
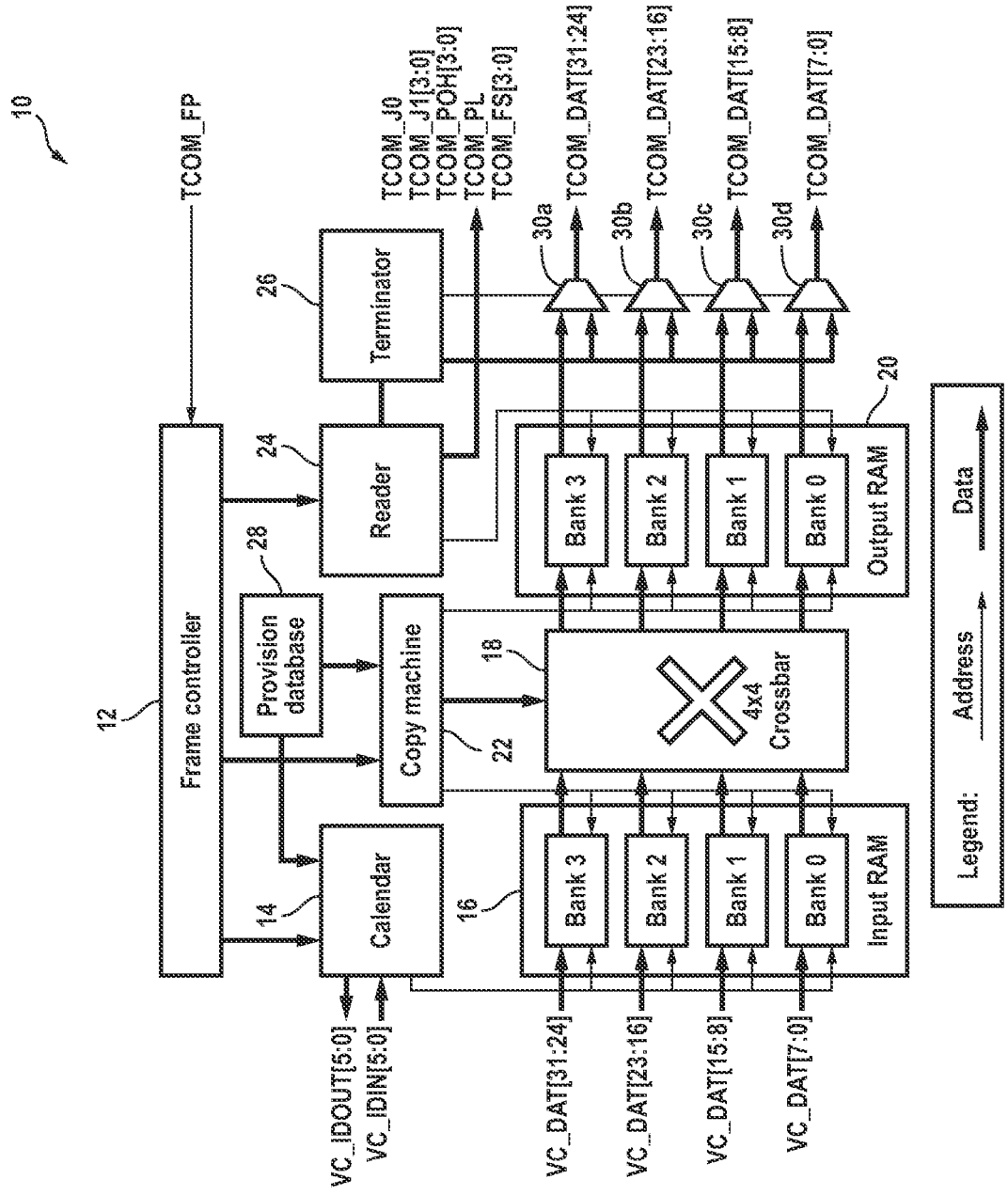
FIG. 2 is a simplified block diagram showing a first exemplary embodiment of the present invention.

FIG. 2 is simplified block diagram showing a first exemplary embodiment of the TVCP 10 which carries STS-48 traffic. Four byte lanes are employed to reduce the line clock rate to 77.7 MHz. The left hand side of the TVCP 10 is coupled to the system side to receive incoming data. The system side can include components such as a generic frame processor (GFP) or an HDLC cell frame processor (CFP). The right hand side of the TVCP 10 is coupled to the line side to allow data processed by the TVCP 10 to be transmitted. The line side typically includes an interface to other SONET/SDH equipment.

According to this first exemplary embodiment, the TVCP 10 is able to support virtual concatenation with either STS-1 or STS-3c granularity (i.e., STS-1-Xv or STS-3c-Xv), any contiguous concatenation (i.e., STS-Nc, where N is a multiple of 3), and mixed concatenations of both STS-3c-Xv and any contiguous concatenation. The TVCP 10 is made up of a number of components, including, a frame controller 12, a calendar 14, an input RAM 16, a crossbar 18, an output RAM 20, a copy machine 22, a reader 24, a terminator 26 and a provision database 28. In a second exemplary embodiment, which will be further described below, the TVCP 10 is enhanced to handle any mixed concatenations (including those with STS-1-Xv).

The frame controller 12 provides a master control function by orchestrating and managing all the components within the TVCP 10. In an exemplary embodiment, the frame controller 12 is implemented using a set of counters which keep track of the row, column, and timeslot of the byte(s) currently being processed.

The calendar 14 is responsible for directing incoming data into the TVCP 10. The calendar 14 is programmable and it specifies the order in which the multiple channels providing the incoming data are to be serviced. Information and data associated with and used by the calendar 14 to direct incoming data are stored in the provision database 28. In the situation where the total aggregated bandwidth of all the channels is less than the maximum allowable bandwidth, the calendar 14 will automatically generate the needed dummy data for any unused timeslots. In order to support hitless re-provisioning, a double buffer is used. In one implementation, the double buffer is a RAM where two copies of the calendar 14 are maintained. The two copies of the calendar 14 are not necessarily, and typically are not, identical. By using the double buffer, one copy of the calendar 14 can be used by the TVCP 10 to direct incoming data while the other copy of the calendar 14 can be updated to reflect future changes to be made in servicing the multiple channels. When the future changes are ready to be implemented, the other copy of the calendar 14 can then be used immediately by the TVCP 10 to direct incoming data. Therefore, for STS-N traffic, a RAM used to implement the calendar 14 contains 2N entries. Details on hitless re-provisioning will be discussed further below.

In an exemplary embodiment, the input RAM 16 includes a number of byte-wide two-port SRAM banks. Data from multiple channels comes in on the write side of the input RAM 16 and is read out by the copy machine 22 on the read side. At a frequency of 77.7 MHz, four (4) SRAM banks are used within the input RAM 16 to support STS-48 bandwidth. Likewise, if the same frequency is to be used, sixteen (16) SRAM banks are used to support STS-192 bandwidth. If the frequency is to be doubled, then eight (8) SRAM banks are used to support STS-192 bandwidth. To support STS-N traffic, each SRAM bank will have 3N entries. As a result, by having the ability to employ a varying number of banks within the input RAM 16, the TVCP 10 can be made scalable to accommodate STS-48, STS-192 and STS-768 traffic. Furthermore, a triple buffer (where the 3N entries are defined previously) is used to accommodate the latency between the time the data is requested and the time the data becomes available. Use of the triple buffer to accommodate data latency will be further discussed below.

The output RAM 20 is similar to the input RAM 16. The output RAM 20 contains the same number of SRAM banks but only has 2N byte-entries in each bank. This difference in byte-entries is attributed to the fact that the output RAM 20 does not have the same latency problem which affects the input RAM 16. The output RAM 20 is used to hold timeslot-interleaved data just before such data is multiplexed with overhead and fixed stuff bytes. The write side and read side of the output RAM 20 is controlled by the copy machine 22 and the reader 24 respectively.

The respective banks in the input RAM 16 and the output RAM 20 are isolated. In order to move data from one bank of the input RAM 16 to another bank of the output RAM 20, the crossbar 18 is employed. The size of the crossbar 18 corresponds to the number of banks in the input RAM 16 and the output RAM 20. For example, if the input RAM 16 and the output RAM 20 each contains four (4) banks, then the crossbar 18 that would be used to move data between the input RAM 16 and the output RAM 20 is a 4×4 crossbar. The control of the data cross-over between the input RAM 16 and the output RAM 20 is determined by the copy machine 18 on a cycle-by-cycle basis. During every cycle, the crossbar 18 moves a certain number of bytes (which is equal to the number of banks) from the input RAM 16 to the output RAM 20. More specifically, each bank in the input RAM 16 is moved to a different bank in the output RAM 20, i.e., the order of the data coming out from the input RAM 16 is different from the order of the data going into the output RAM 20 due to operation of the crossbar 18.

The reader 24 performs a number of functions based on the value of a timeslot counter. The timeslot counter is located in the frame controller. For example, the reader 24 generates several indication signals including TCOM_J0, TCOM_J1, TCOM_POH, TCOM_PL and TCOM_FS, which indicate respectively that TCOM_DAT carries J0, J1, path overhead, payload data, and fixed stuff. The reader 24 also controls the read operation of the output RAM 20.

The terminator 26 maintains a register which holds the multi-frame indicator (MFI) for all the timeslots. The terminator 26 also keeps track of the sequence number (SQ) for each virtual channel. The terminator 26 further functions in cooperation with the reader 24 to generate the MFI and SQ fields of the H4 byte in the path overhead. In addition, the terminator 26 also controls the multiplexors 30a–d to select between payload data and overhead and fixed stuff for output to the line side.

The copy machine 22 causes data to be moved from the input RAM 16 to the output RAM 20, performing both time and space conversion required by the provisioning. The TVCP 10 outputs a data word on TCOM_DAT[31:0] every cycle. The data word can be for payload, transport overhead, path overhead or fixed stuff. As shown in FIG. 4, during every cycle when the data word is for payload, the copy machine 22 causes four (4) bytes of data to be read out from the input RAM 16 and into the crossbar 18. More specifically, one and only one byte is read out from each bank of the input RAM 16. The crossbar 18 then shuffles or re-arranges the four (4) bytes of data and writes them into the output RAM 20. In particular, each of the four (4) bytes of data is written to a different bank in the output RAM 20. Using the TVCP 10 shown in FIG. 2 as an example, one (1) byte of data is read from each of the banks, Bank 0, Bank 1, Bank 2 and Bank 3, of the input RAM 16. The four (4) bytes of data are then transferred via the crossbar 18 to the four banks, Bank 0, Bank 1, Bank 2 and Bank 3, of the output RAM 20, with each bank receiving one and only one of the four (4) bytes. The way the copy machine 18 reads, maps and writes data is determined by a schedule RAM (not shown) located within the provision database 28. In STS-N traffic, there are N timeslots, so the copy machine 18 has a period of N cycles.

The schedule RAM is organized as 2N entries by W(log N+log W+log N) bits. The schedule RAM is programmed according to a schedule before it can be used by the copy machine 22. The schedule contains channel mapping information which is used to control how the copy machine 22 is to use the crossbar 18 to read, map and write data between the input RAM 16 and the output RAM 20. W represents the number of banks in the input RAM 16 or the output RAM 20. Within the schedule RAM, a double buffer is used for hitless re-provisioning, and a wide data bus contains information which is used to control the W banks of the input RAM 16 and the output RAM 20. The first logN specifies the read address in the input RAM 16, and the second logN specifies the write address in the output RAM 20. logW is used to configure the crossbar 18 to switch data from one bank in the input RAM 16 to another bank in the output RAM 20.

Figure 3:
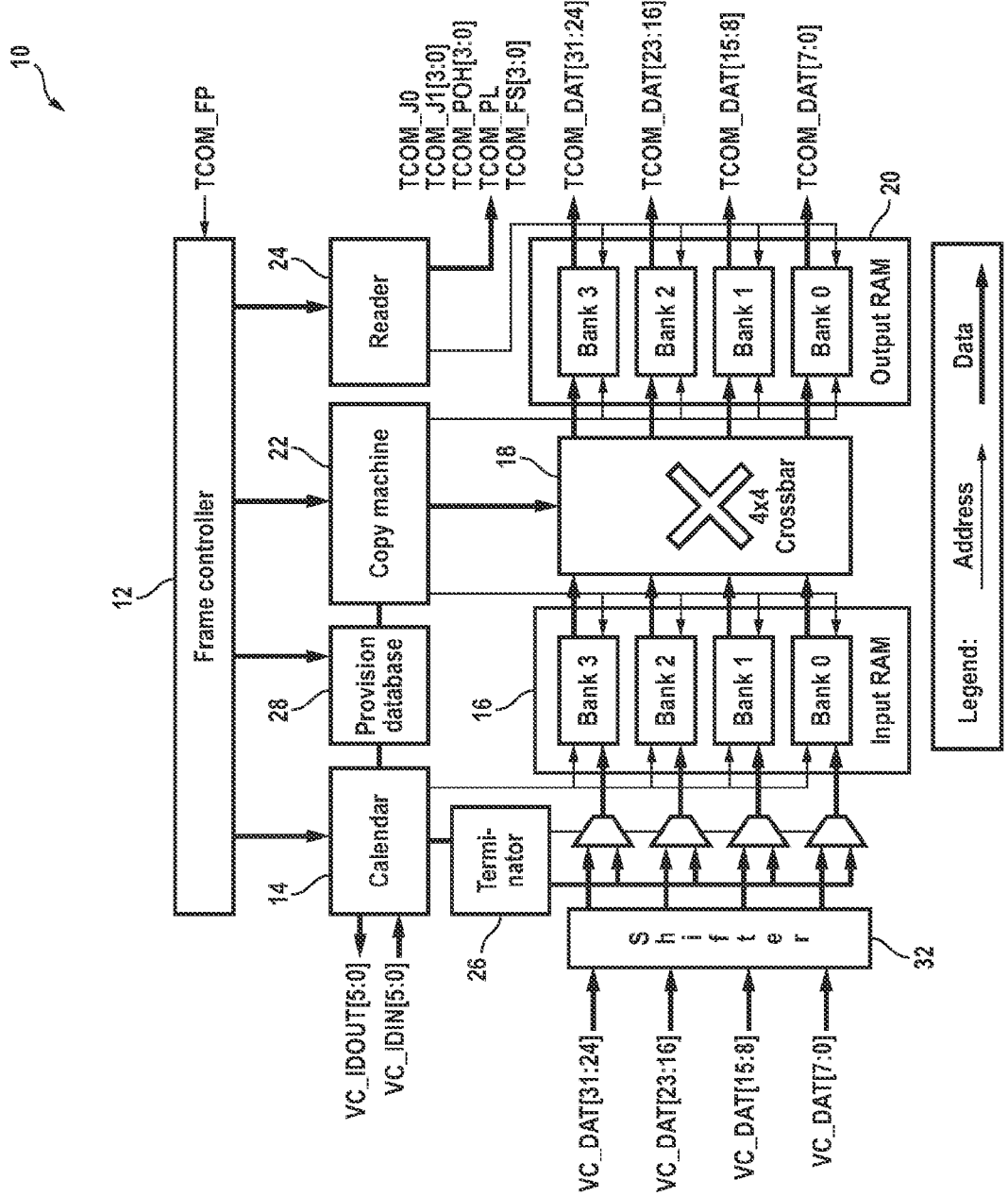
FIG. 3 is a simplified block diagram showing a second exemplary embodiment of the present invention.

In a second exemplary embodiment, as shown in FIG. 3, a shifter 32 is included as part of the TVCP 10. By including the shifter 32, the TVCP 10 is able to support mixed concatenations that have STS-1-Xv. Since the bandwidth of STS-1 is slightly lower than ⅓ of STS-3c, overhead insertion and termination are done by the terminator 26 at the front-end and the shifter 32 is used to redistribute data bytes along with overhead and fixed stuff bytes before these bytes are fed to the input RAM 16 while keeping bandwidth matched. As a result, the TVCP 10 is able to support any virtual concatenation, any contiguous concatenation, and any mixed concatenation.

Figures 4A, 4B, 4C:
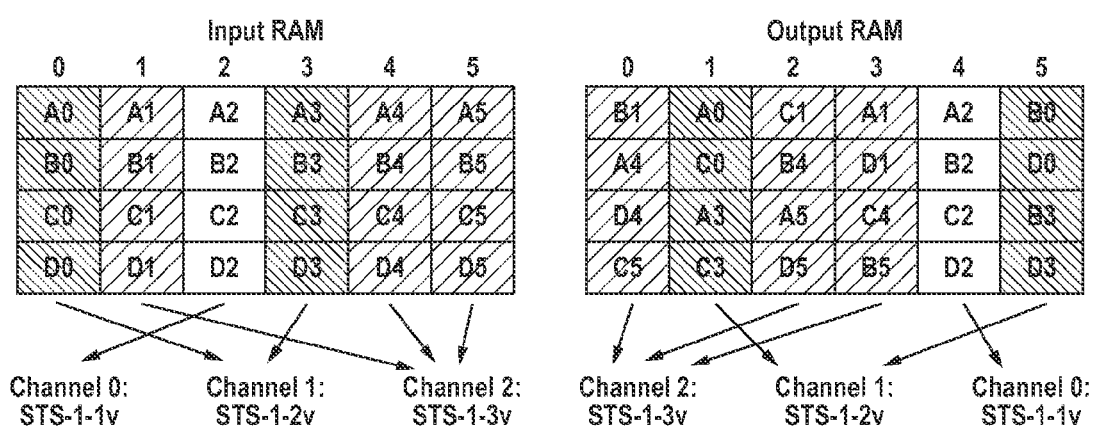
FIGS. 4a–4c are simplified diagrams illustrating an example of a copy process in accordance with an exemplary embodiment of the present invention.

An example is provided below to illustrate the copy process which transfers data between the input RAM 16 and the output RAM 20. Suppose that three virtual channels, namely, Channel 0, Channel 1 and Channel 2, are mapped to six timeslots as shown in FIG. 4a. On the side of the output RAM 20, data from Channel 0 is designated to go into timeslot 4; data from Channel 1 is designated to go into timeslots 1 and 5; and data from Channel 2 is designated to go into timeslots 3, 0 and 2.

Furthermore, FIG. 4a also shows sequence numbers assigned to the timeslots. Each timeslot mapped to a channel is assigned a sequence number. The sequence numbers are used to differentiate and provide an identifiable order for the timeslots mapped to the same channel. Within each group of timeslots mapped to a channel, the timeslots are assigned their respective sequence numbers in sequential order. For example, timeslots 3, 0 and 2 which are mapped to Channel 2 are assigned sequence numbers 0, 1 and 2 respectively; similarly, timeslots 1 and 5 which are mapped to Channel 1 are assigned sequence numbers 0 and 1 respectively.

According to FIG. 4b, the calendar 14 is set up such that, on the system side, the TVCP 10 is going to service Channel 1 first, and then Channel 2, and then Channel 0, and then Channel 1 again, and so on. It should be noted that the calendar setup needs to match the bandwidth distribution. For example, Channel 2 is STS-1–3v, so it needs to have 3 entries in the calendar 14. Furthermore, FIG. 4b also shows the sequence numbers associated with the timeslots which are arranged in a sequential order.

Based on the channel mapping provided in FIGS. 4a and 4b, the correlation of data bytes in the input RAM 16 and the output RAM 20 is shown in FIG. 4c. For example, on the side of the input RAM 16, data bytes A0, B0, C0 and D0 come from Channel 1 and occupy timeslot 0. These bytes are eventually copied over to the output RAM 20 and occupy timeslots 1 and 5.

The cycle-by-cycle breakdown of the copy process shown in FIGS. 4*a*–4*c* is illustrated in further detail in FIG. 5. As FIG. 5 illustrates, in every cycle, four (4) bytes are copied from the input RAM 16 to the output RAM 20. The four (4) bytes which are to be copied during each cycle are determined by the copy machine 22 and the schedule RAM. The four (4) bytes are selected in such a way so as to eliminate conflicts in reading out the bytes from the banks of the input RAM 16 and writing the bytes to the banks of the output RAM 20. For example, each of the four (4) bytes is selected from a different bank of the input RAM 16; similarly, each of the four (4) bytes to be outputted to the output RAM 20 is written to a different bank of the output RAM 20. In this example, it takes six (6) cycles to copy the six (6) timeslots from the input RAM 16 to the output RAM 20. A person of ordinary skill in the art would understand that the same logic can be easily extended to handle STS-N traffic with W banks, where it takes N cycles to copy the input RAM 16 and W bytes are transferred in each cycle.

By using the copy machine 22 in cooperation with the input RAM 16, the crossbar 18 and the output RAM 20, arbitrary virtual concatenation with STS-1 or STS-3c granularity can be supported. Other proprietary concatenation formats and non-standard virtual concatenation can be supported as well.

In addition to multiplexing payload data, the TVCP 10 is also able to terminate some overhead bytes including the H1, H2 and H3 bytes in the line overhead and the H4 byte in the path overhead. For other overhead bytes, the TVCP 10 simply fills in a predefined value (e.g. 0x00 or 0xff) as a place holder and lets the downstream SONET equipment replace such other overhead bytes with other values. Optionally, the TVCP 10 can include other components to terminate additional section, line and/or path overhead.

The TVCP 10 is a traffic generator. In order to simplify matters, all the timeslots are preferably perfectly aligned, i.e. their J1 byte starts at exactly the same position. In this way, one set of counters can be maintained for all the timeslots. Since all the timeslots are aligned, the TVCP 10 only needs one set of counters to track the processing position within a SONET/SDH frame. Moreover, for virtual concatenation, the TVCP 10 can use one multi-frame indicator for all the timeslots. As a result, the logic is greatly simplified.

It should be noted that, in the TVCP 10 as shown in FIG. 2, overhead termination is done at the end of the datapath. Hence, the copy machine 22, as shown in FIG. 2, only deals with payload data. This is because every byte in the input RAM 16 is from the system side and eventually every byte will be output to the line side via the output RAM 20. For STS-N traffic over W banks, the copy machine 22 has a period of N cycles, where W×N bytes are processed in each period. Compared to an entire SONET/SDH frame, the payload data is contained in a very small window. FIG. 6 shows a few possible locations of the sliding window for the TVCP 10 depicted in FIG. 2. Since four (4) banks are used in the TVCP 10, the sliding window only spans four (4) columns. As can be seen, the sliding window does not have a global view of an entire SONET/SDH frame.

One possible solution to the overhead and fixed stuff insertion problem is to include the non-payload data in the datapath. However, since the sliding window sees different combinations of payload and non-payload data as it strides through a SONET/SDH frame, the schedule needs to be changed accordingly.

One way to resolve the overhead and fixed stuff insertion problem is to insert non-payload data on the fly, so that only one static schedule is required. When overhead or fixed stuff is inserted, the copy machine 22 is paused. Since the copy machine 22 deals with data from all timeslots, the overhead and fixed stuff columns need to be aligned, otherwise this scheme will fail if one timeslot has overhead and another timeslot has payload data. When all the timeslots are aligned, they will either all encounter payload data, or all encounter non-payload data. Therefore, the scheme works well for homogeneous concatenation, where all channels are STS-1-Xv, STS-3c-Xv, STS-12c, STS-24c, . . . etc. and there is no mixture of these traffic types (note that STS-1–3v and STS-1–8v are considered homogeneous, because they both break down to STS-1 timeslots). Hence, by pausing the copy machine 22 at the appropriate time and providing overhead termination at the write side of the output RAM 20, SONET/SDH frame encapsulation is simplified.

In an exemplary STS-48 device, four transmit header processors are connected to the four (4) banks of the TVCP 10. Each header processor is capable of handling STS-1, STS-3c and STS-12c traffic. A number of header processors can be cascaded together to handle higher bandwidth. For example, the four header processors can collectively handle STS-1, STS-3c, STS-12c, STS-24c, STS-36c and STS-48c traffic.

FIG. 7 shows how the different traffic types are mapped to each timeslot by each header processor. In STS-1, each header processor processes twelve (12) independent timeslots. As mentioned before, the twelve (12) timeslots are aligned, as shown in the second row of FIG. 7 as well. In STS-3c, each header processor processes four (4) independent flows. Again, the timeslots are aligned as shown in the third row of FIG. 7. In STS-12c, each header processor processes one (1) flow. In STS-24c, two (2) header processors are needed to process one (1) flow. In STS-36c, three (3) header processors are needed to process one (1) flow. Finally in STS-48c, all the four header processors are needed to process one (1) flow.

From the shaded columns in FIG. 7, it can be seen that any contiguous concatenation traffic and virtual concatenation with STS-3c granularity (i.e., STS-3c-Xv) can be nicely mixed without causing any misalignment of data patterns. For example, the TVCP 10 can deal with a scenario where there are one STS-3c channel, one STS-3c–3v channel, one STS-12c channel, and one STS-24c channel, as long as the STS-3c and STS-3c–3v channels are mapped to one header processor, the STS-12c channel is mapped to another header processor, and the STS-24c channel is mapped to the remaining two header processors. It should be noted, however, that STS-1 traffic cannot be mixed with other types of traffic. This is because the path overhead bytes (POH5–POH12) of STS-1 traffic are lined up with the payload data bytes of other traffic types, thereby rending it impossible to pause the copy machine 22 properly. The second exemplary embodiment of the TVCP 10 (as shown in FIG. 3) is enhanced to handle this problem, as will be more fully addressed below.

It is evident that the TVCP 10 as shown in FIG. 2 is able to handle any contiguous concatenations mixed with STS-3c-Xv but not with STS-1-Xv. This is because every traffic type above STS-3c is aligned while STS-1 cannot be aligned with other traffic type as shown in FIG. 7. In order to handle any mixed concatenations, non-payload data need to be introduced into the datapath from the very beginning so as to allow the copy machine 22 to work with a single schedule regardless of the location of the processing window. Alternatively, as described above, the TVCP 10 shown in FIG. 3 is able to handle any mixed concatenations. This is accomplished by having the shifter 32 and the terminator 26 perform overhead termination at the beginning of the datapath, thereby allowing the copy machine 22 to transfer not only payload data but also overhead and fixed stuff bytes as well.

Hitless re-provisioning will now be described in further detail. Hitless re-provisioning means that the channel mapping can be changed without losing any data. This is a complicated issue since it involves cooperation between both the transmit side and the receive side. According to an exemplary embodiment, the TVCP 10 is able to switch provisioning without losing any data.

Figure 8:
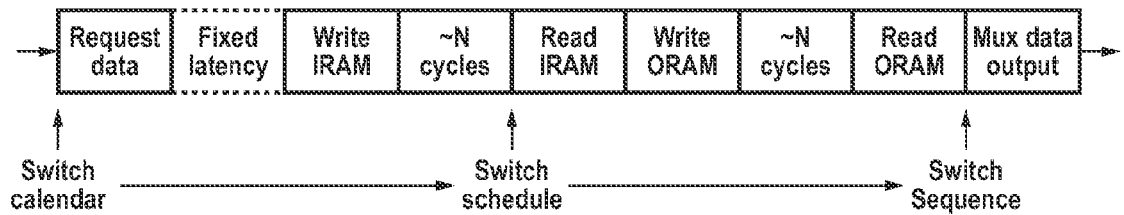
FIG. 8 is a simplified diagram illustrating pipeline stages of the datapath in accordance with an exemplary embodiment of the processor architecture shown in FIG. 2.

The datapath of the TVCP 10 is heavily pipelined. In the exemplary embodiment of the TVCP 10 as shown in FIG. 2, overhead insertion happens at the end of the datapath. As illustrated in FIG. 8, the TVCP 10 datapath begins with the calendar 14 generating a data request. After a fixed latency, data arrives and is written into the input RAM 16. After N cycles (where N is the total number of timeslots) when one of the triple buffers is filled up, the copy machine 22 will read data out of the input RAM 16, use the crossbar 18 to shuffle the data, and then write the data into the output RAM 20. Again, after N cycles when one of the double buffers is filled up, data is read out of the output RAM 20 and multiplexed with overhead and fixed stuff. When changes are made to the channel mapping, i.e., channels are mapped to different timeslots, three entities, namely, the calendar 14, the schedule and the sequence numbers, need to be switched to reflect the changed channel mapping. Switching of the three entities will be described in more detail below.

Figure 9:
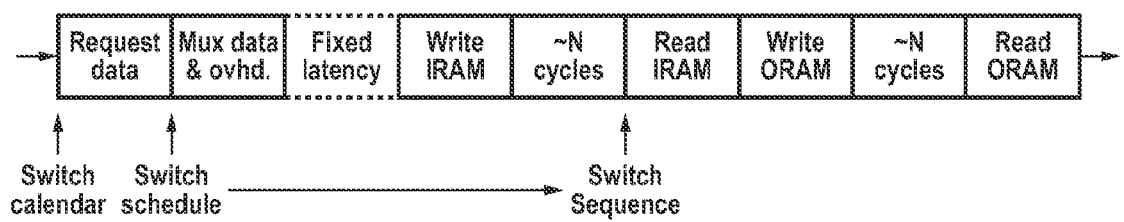
FIG. 9 is a simplified diagram illustrating pipeline stages of the datapath in accordance with an exemplary embodiment of the processor architecture shown in FIG. 3.

In the exemplary embodiment of the TVCP 10 shown in FIG. 3, since STS-1 can be mixed with STS-3c, STS-12c, STS-24c, . . . etc., overhead insertion happens at the beginning of the datapath. As illustrated in FIG. 9, it begins with the calendar 14 generating a data request, which will only happen for timeslots that are not in the overhead or fixed stuff columns. For those timeslots that are in the overhead or fixed stuff columns, the calendar 14 will skip sending out any requests and the overhead or fixed stuff bytes will be inserted later in the "Mux data & overhead" stage. Both data and non-data (overhead and fixed stuff) bytes will be written into the input RAM 16. After that, the pipeline stages are almost the same as in FIG. 8, except that the final "Mux data output" stage is not needed. Because of the difference, the switch time of the calendar 14, the schedule and the sequence numbers need to be adjusted accordingly.

Provisioning involves setting up three entities: the calendar 14, the schedule and the sequence numbers. As described above, the calendar 14 controls how the channels are to be serviced and mapped to the timeslots; the schedule determines how data are to be moved from the input RAM 16 to the output RAM 20; and the sequence numbers are used to differentiate and provide an identifiable order for the timeslots mapped to the same channel. In order to switch provisioning hitlessly, i.e., change channel mapping without losing any data, the three entities are each implemented with a double buffer. For example, in one implementation, the double buffer is a RAM where two copies of the calendar 14 are maintained. The two copies of the calendar 14 are not necessarily, and typically are not, identical. By using the double buffer, one copy of the calendar 14 can be used by the TVCP 10 to direct incoming data from the multiple channels while the other copy of the calendar 14 can be updated to reflect future channel mapping changes to be made in servicing the multiple channels. When the future changes are ready to be put into effect, the other copy of the calendar 14 can then be used immediately by the TVCP 10 to direct incoming data. Likewise, the double buffers for the schedule and the sequence numbers are used for a similar purpose so as to allow changes to the schedule and the sequence numbers to be made and put into effect more efficiently.

When channel mapping is to be changed, the three entities (i.e., the calendar 14, the schedule and the sequence numbers) need to be switched in a specific sequence that is in accordance with the pipeline delays. For example, as shown in FIG. 8, the schedule cannot be switched until the data corresponding to the new provisioning caused by the calendar switch have arrived at the input RAM 16. Similarly, the sequence numbers cannot be switched until the data corresponding to the new provisioning caused by the schedule switch have arrived at the output RAM 20. This is done to ensure that data directed by the old calendar 14 are processed by the corresponding old schedule and the appropriate sequence numbers based on the old channel mapping are assigned. Similarly, FIG. 9 shows the switching sequence of the three entities based on the exemplary embodiment of the TVCP 10 shown in FIG. 3.

Moreover, even if the switch is aligned with the pipeline, the switch cannot happen at any time. Since the receive end needs to be notified of the change, the calendar switch will only occur at a multi-frame boundary when the TVCP 10 is about to send out a new MFI, i.e., output from the output RAM 20 needs to be aligned with the multi-frame boundary. By switching at the multi-frame boundary, the receive end is then able to synchronize with the new provisioning.

Figure 10:
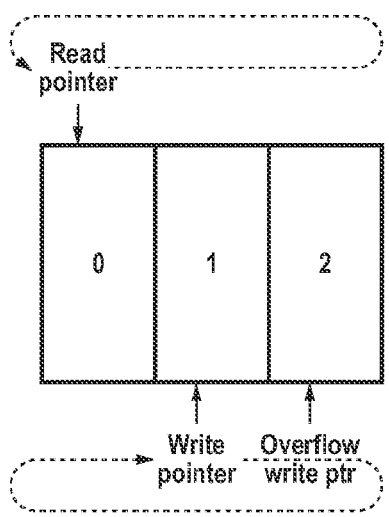
FIG. 10 is a simplified diagram showing one exemplary embodiment of an input RAM in accordance with the present invention.

When the copy machine 22 is paused, the calendar 14 is also paused so that the input RAM 16 will not overflow. Since there is a latency between the time the data is requested and the time the data becomes available on the system side, the input RAM 16 needs to be expanded to absorb data dribbling. In an exemplary embodiment, the input RAM 16 is triple buffered in order to absorb data dribbling. This is to support a fixed latency from data request to data available on the system side. Because of the latency, even if the TVCP 10 stops requesting data, there may still be data coming in due to previous requests. The larger the latency, the more dribble the TVCP 10 will see. Hence, a third buffer is added to the input RAM 16 to absorb data dribble as shown in FIG. 10. The three buffers work alternately: while buffer 0 is being read, buffer 1 is being written, and if overflow occurs due to outstanding data requests, buffer 2 will be used. N cycles later, after all the data in buffer 0 has been moved to the output RAM 20, the read pointer moves to buffer 1, and the write pointer just keeps incrementing until it hits the end of buffer 2. When that happens, the write pointer rolls over to the first entry in buffer 0. This scheme simplifies the logic and ensures that the input RAM 16 will never overflow or underflow, provided that the maximum latency is less than N cycles.

In an alternative exemplary embodiment, the input RAM 16 can be implemented as a double buffer with a small amount of memory to buffer the latency from data request to data available.

In an exemplary embodiment, the TVCP 10 can be implemented in programmable logic devices such as a field programmable gate array (FPGA). Alternatively, the TVCP 10 can also be implemented within a fixed-function semiconductor devices such as an application specific integrated circuit (ASIC). A person of ordinary skill in the art will know of other ways and methods to implement or incorporate the present invention into other devices.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for multiplexing input data from a plurality of channels onto a selected one of a plurality of SONET/SDH frames having different sizes, comprising:
    a calendar configured to selectively multiplex the input data received from the plurality of channels;
    a processor configured to receive the multiplexed input data and re-arrange the multiplexed input data onto the selected SONET/SDH frame using virtual concatenation or contiguous concatenation or a combination of both; and
    a terminator configured to terminate overhead bytes within the selected SONET/SDH frame, wherein the processor further comprises:
    an input RAM configured to receive and output the multiplexed input data;
    a crossbar configured to receive and re-arrange the multiplexed input data outputted from the input RAM;
    an output RAM configured to receive the re-arranged multiplexed data from the crossbar; and
    a copy machine configured to control and coordinate operation of the input RAM, the crossbar and the output RAM, wherein the copy machine is further configured to control and coordinate the operation of the input RAM, the crossbar and the output RAM in accordance with a schedule; wherein the overhead bytes include sequence numbers; and wherein the calendar, the schedule and the sequence numbers are each double buffered and switched in a predetermined sequence so as to allow hitless re-provisioning.

2. The system according to claim 1 wherein the copy machine is paused when the overhead bytes are inserted into the selected SONET/SDH frame.

3. The system according to claim 1 wherein the input RAM comprises a plurality of memory banks.

4. The system according to claim 1 wherein the input RAM is triple buffered thereby allowing the system to support a fixed latency from data request to data available.

5. The system according to claim 4 wherein the fixed latency is up to N cycles for STS-N traffic.

6. The system according to claim 1 wherein the processor is further configured to handle arbitrary virtual concatenation with STS-1 or STS-3 granularity.

7. The system according to claim 1 wherein the processor is further configured to handle contiguous concatenation with STS-Nc capacity, where N is a multiple of 3.

8. The system according to claim 1 wherein the processor is further configured to handle non-standard virtual concatenation and one or more proprietary concatenation formats.

9. The system according to claim 1 wherein the processor is configured to handle mixed concatenation of one or more contiguous concatenation traffic and virtual concatenation traffic with STS-3c granularity.

10. The system according to claim 1 wherein the system is implemented in a programmable logic device.

11. The system according to claim 1 wherein the processor is further configured to receive and process the overhead bytes; and the system further comprising:
    a shifter configured to redistribute the overhead bytes and the input data received from the plurality of channels before the overhead bytes and the input data are selectively directed by the calendar to the processor.

12. The system according to claim 11 wherein the processor is configured to handle one or more mixed concatenation including STS-1-Xv.

13. The system according to claim 1 wherein the overhead bytes terminated by the terminator include H1, H2 and H3 bytes in line overhead and H4 byte in path overhead.

14. The system according to claim 13 wherein a multiframe indicator and a sequence number are inserted into the H4 byte in the path overhead.

15. The system according to claim 1 wherein the different sizes of the plurality of SONET/SDH frames include STS-12, STS-48, STS-192 and STS-768.

* * * * *